(12) United States Patent
Raghav et al.

(10) Patent No.: US 8,155,294 B2
(45) Date of Patent: Apr. 10, 2012

(54) ASSOCIATING A TELEPHONE CALL WITH A DIALOG BASED ON A COMPUTER PROTOCOL SUCH AS SIP

(75) Inventors: Amritansh Raghav, Seattle, WA (US); Danny Levin, Redmond, WA (US); Parag Samdadiya, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1293 days.

(21) Appl. No.: 11/205,762

(22) Filed: Aug. 15, 2005

(65) Prior Publication Data

US 2007/0036144 A1 Feb. 15, 2007

(51) Int. Cl.
*H04M 3/42* (2006.01)
(52) U.S. Cl. .................. 379/201.01; 379/219; 379/229; 370/35
(58) Field of Classification Search .................. 379/350, 379/229, 201.01, 201.07, 201.08, 219, 220.01, 379/373.01; 370/352, 353, 354, 355, 356, 370/357
See application file for complete search history.

(56) References Cited

U.S. PATENT DOCUMENTS

| 2001/0036176 | A1 | 11/2001 | Girard |
| 2003/0007483 | A1 | 1/2003 | Um |
| 2003/0043992 | A1* | 3/2003 | Wengrovitz ................... 379/229 |
| 2003/0081753 | A1* | 5/2003 | Trandal et al. ........... 379/210.01 |
| 2003/0088421 | A1 | 5/2003 | Maes et al. |
| 2003/0205209 | A1 | 11/2003 | Lim |
| 2004/0032862 | A1 | 2/2004 | Schoeneberger et al. |
| 2004/0205209 | A1 | 10/2004 | Wengrovitz et al. |
| 2004/0258238 | A1 | 12/2004 | Wong |
| 2005/0083909 | A1* | 4/2005 | Kuusinen et al. ............. 370/352 |
| 2005/0123117 | A1* | 6/2005 | Stockdale ................ 379/207.02 |
| 2005/0240674 | A1* | 10/2005 | Depalma et al. .............. 709/230 |

FOREIGN PATENT DOCUMENTS

| EP | 1 515 506 A1 | 3/2005 |
| GB | 2408411 A | 5/2005 |
| WO | WO 03/088685 A1 | 10/2003 |
| WO | WO 2005/013562 A1 | 2/2005 |
| WO | WO 2005/039132 A1 | 4/2005 |

OTHER PUBLICATIONS

"Mitel Introduces Extensive New Teleworker and Remote Office Functionality," Mitel Networks Corporation, Dec. 2, 2004 (2 pages) http://www.mitel.com/DocController?documentId=13055&mode=print.
"Setting Up SIP-PSTN Connectivity in Live Communications Server 2005 with SP1," Jun. 2005, Microsoft Office Live Communications Server 2005, Microsoft Corporation, 14 pages.
International Search Report for PCT Application No. PCT/US06/28381 issued on Feb. 6, 2008.
"Using CSTA for SIP Phone User Agents (uaCSTA)," Technical Report ECMA TR/87, 1st Edition, Jun. 2004, sections 5 and 16, 28 pages.

* cited by examiner

*Primary Examiner* — Ahmad Matar
*Assistant Examiner* — Khai N Nguyen
(74) *Attorney, Agent, or Firm* — Perkins Coie LLP

(57) ABSTRACT

Providing non-voice capabilities relating to a phone call at a computing device includes receiving a request to begin a telephone call from a first telephone to a second telephone, wherein the requesting is performed using messaging between computing devices connected via a computer network, and wherein the messaging is part of a signaling phase dialog. The signaling phase dialog may be used in providing information associated with the identity of parties of the telephone call. Commencing a call phase dialog between the computing devices may be performed after the telephone call is established over the public switched telephone network. The call phase dialog may allow messages relating to the telephone call to be passed between the computing devices, at least while the telephone call is in progress. The dialogs and messaging may be performed using session initiation protocol (SIP) or another computer communication protocol.

19 Claims, 7 Drawing Sheets

ASSOCIATING A TELEPHONE CALL WITH A DIALOG BASED ON A COMPUTER PROTOCOL SUCH AS SIP

BACKGROUND

Signaling may often be used in the public switched telephone network (PSTN) to set up and terminate circuits, sessions, and so on. For example, one of the signaling protocols for the PSTN is called Common Channel Signaling System 7 (SS7). In the PSTN, existing signaling protocols may provide support for basic call setup and tear down, billing, wireless services and roaming, local number portability, toll-free calling services, caller ID, three-way calling, call forwarding enhanced features, etc. However, these existing signaling protocols provide limited support. For example, with respect to caller ID, there is no guarantee that caller ID information will traverse end to end. Another issue is that the caller ID is not unique to a user if the call originates from a private branch exchange (PBX) extension, or the like. For example, when an Acme Corporation employee places a call, it may identify "Acme" rather than the employee.

Unlike PSTN signaling protocols, session initiation protocol (SIP) is not limited to communication during set signaling phases. SIP is an application-layer control protocol that computer systems can use to discover one another and to establish, modify, and terminate multimedia sessions. For example, SIP is one of the key protocols used in implementing Voice over IP technology. Implementing Voice over IP technology typically involves converting voice information to digital form and sending it in discrete packets rather than in the traditional circuit-committed protocols of the PSTN. SIP is also associated with implementing features such as instant messaging and other "real time" communication techniques. For example, an instant messaging service allows participants to send messages and have them received within a second or two by the other participants in the conversation. The receiving participants can then send responsive messages to the other participants in a similar manner.

SIP is an Internet proposed standard. Its specification, "RFC 3261," is available at <http://www.ieff.org/rfc/rfc3261.txt>. A specification for extensions to SIP relating to event notifications, "RFC 3265," is available at <http://www.ieff.org/rfc/rfc3265.txt>. A SIP network comprises entities that can participate in a dialog as a client, server, or both. SIP supports four types of entities: user agent, proxy server, redirect server, and registrar. User agents initiate and terminate sessions by exchanging messages with other SIP entities. A user agent can be a user agent client ("UAC"), which is a device that initiates SIP requests, or a user agent server ("UAS"), which is a device that receives SIP requests and responds to such requests. As examples, "IP-telephones," personal digital assistants, and any other type of computing device may be user agents. A device can be a UAC in one dialog and a UAS in another, or may change roles during the dialog. A proxy server is an entity that acts as a server to clients and a client to servers. In so doing, proxy servers intercept, interpret, or forward messages between UACs and UASs. A redirect server accepts a SIP request and generates a response directing the UAC that sent the request to contact an alternate network resource. A registrar is a server that accepts registration information from user agents and informs a location service of the received registration information.

SIP supports two message types: requests, which are sent from a UAC to a UAS, and responses, which are sent from a UAS to a UAC when responding to a request. A SIP message is composed of three parts. The first part of a SIP message is a "request line," which includes fields to indicate a message method (e.g., INVITE) and a Request URI that identifies the user or service to which the request is being directed. The second part of a SIP message comprises headers whose values are represented as name-value pairs. The third part of a SIP message is the message's body, which is used to describe the session to be initiated or contain data that relates to the session. Message bodies may appear in requests or responses.

SUMMARY

A method and system for associating a phone call with a computer dialog such as session initiation protocol (SIP) is provided. The dialog may allow for providing information relating to a phone call at a computing device. Party A wants to call Party B. Both Party A and Party B have computing devices and telephones. Using messaging between their computing devices, Party A sends a request to begin a telephone call with Party B. Provided that this request is accepted by Party B's computing device, a signaling phase of a computer dialog (e.g., a SIP invite transaction dialog) is established, and an attempt is made to initiate a telephone call via the public switched telephone network (PSTN). When confirmation is received that the telephone call has been successfully, established, assuming proper configuration, Party A's computing device and Party B's computing device begin a call phase computer dialog (e.g., a SIP dialog). The computer dialog (in both the signaling phase or the call phase) may be used to send messages about the identity of Party A and Party B, the status of the telephone call, the status of the devices associated with the telephone call, etc.

Several system components may enable the setting of up the dialog, these may or may not include communication applications running on Party A's and Party B's computing devices, a live communication server that assists in passing messages between Party A's and Party B's computing devices, interfaces between the public switched telephone network and the computing devices, components of the public switched telephone network (which may include PBX's), etc.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

A facility (e.g., software facility and related system) for associating a phone call with a computer-based dialog is provided. In some embodiments, an end-to-end SIP dialog is established in conjunction with a phone call made over a "plain old telephone network" such as the public switched telephone network (PSTN). The facility then synchronizes PSTN call states with SIP dialog states. For example, the calling party may be identified to the called party using the SIP dialog. This allows the called party to identify the calling party even when the call does not include caller ID information. In addition, SIP is extended using one or more fields to support the synchronization of PSTN states with SIP states. Examples of such extensions include one or more call information fields (e.g., sent via a SIP INVITE), one or more call information response fields (e.g., sent via SIP 200 OK) and one or more call information match fields (e.g., sent via SIP ACK).

In some embodiments, when a user (caller) wants to place a call to somebody (called party) who is in his or her computer contact list, he or she selects that contact and indicates to place a call to that contact. At that time, an application on the caller's computing device will send a request (e.g., a SIP INVITE) to the called party's computing device, starting a signaling phase dialog. The request may include an indication that telephone information is an aspect of establishing a dialog with the contact. The called party at that point knows to expect a telephone call from the caller. If the called party's computing device replies with an acceptance and indicates that it supports the telephone information, then the caller's computing device places a call through the telephone system, and then waits until it gets a delivered message indicating that it is starting to ring at the called party's telephone. Once the called party hears the telephone ringing, the called party can anticipate that the call will be from the caller, which will be the case unless a call is received from another caller just before the call of the caller who sent the SIP message would have been received. When the caller's computing device receives an indication that the call was answered and that a computer exchange has taken place, then the caller's computing device knows that the PSTN phone call was successful and sends a computer message indicating success. The called party at that point then knows that the call is from the anticipated caller.

After the call is answered an acknowledgement received, a call phase computer dialog is established. Accordingly, information can be sent back and forth between the caller computing device and the called party computing device. This information may include indications that the call has been placed on hold, deflected, transferred, etc.

Figure 1:
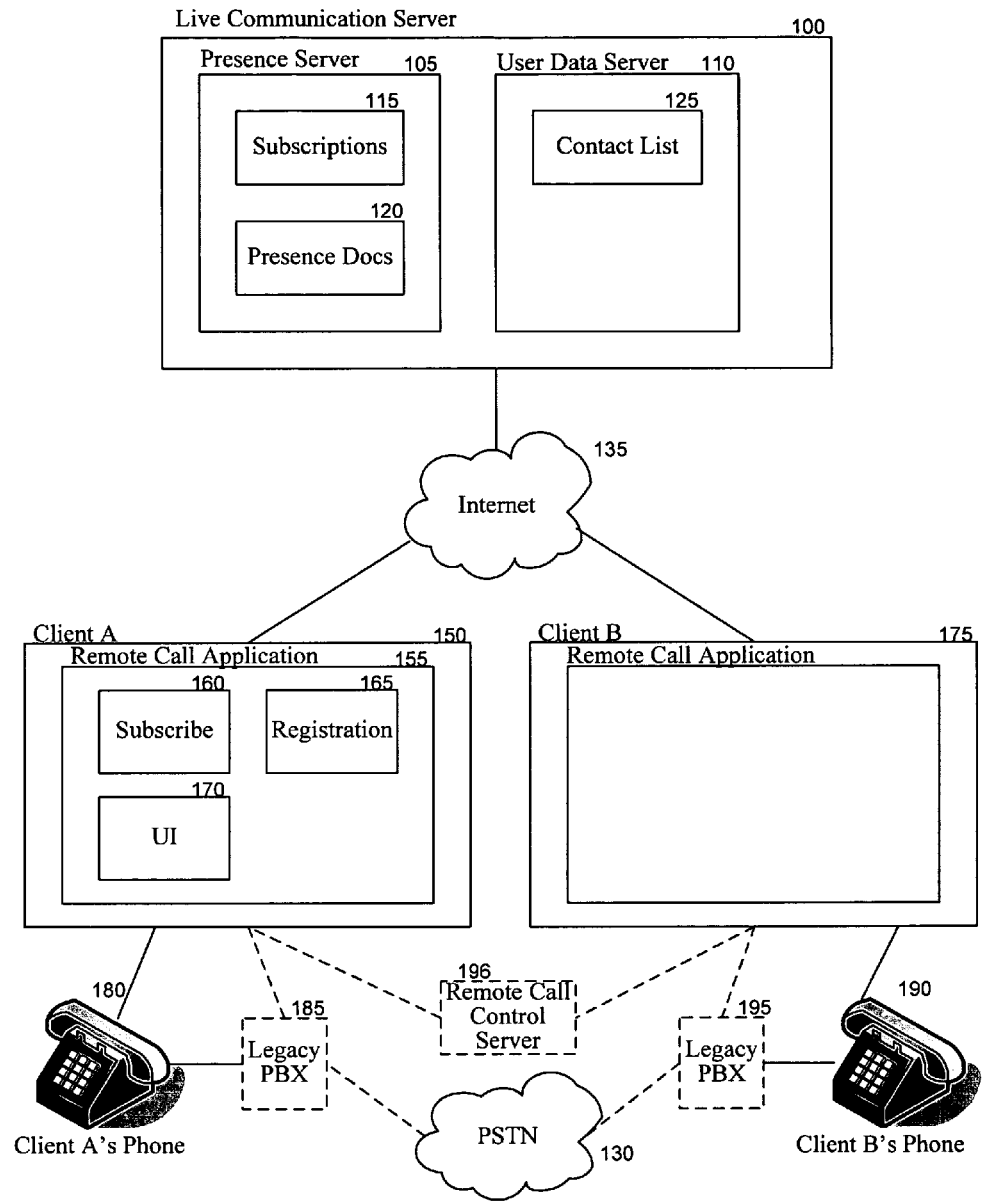
FIG. 1 is a block diagram that illustrates components of the system for associating a phone call with a SIP dialog in one embodiment.

FIG. 1 is a block diagram that illustrates components of the facility in one embodiment. In some embodiments, the facility includes a live communication server 100 connected to one or more clients 150 and 175 through the Internet 135. The live communication server 100 contains a presence server 105, which can be a SIP registrar that maintains status information about each user of the instant messaging service. The presence server 105 may contain a subscriptions component 115 and a presence document store 120. The subscriptions component 115 maintains, for each user, the current list of users who are subscribed to that user's presence information. The status information for each user may be represented in the form of a document, called a presence document. The presence document store 120 contains the presence document for each user indicating the user's current status on the live communication server 100.

A user data server 110 maintains persistent data for each user and contains a contact list store 125. The contact list store 125 contains a list of each user's contacts. In some embodiments, the live communication server 100 provides the list of contacts of a user to the registered endpoints of that user. An example of such endpoints includes client A 150 and client B 175, which may both be associated with human users. In some embodiments, the clients 150 and 175 include a communication application 155. The communication application 155 may contain a subscribe component 160, a registration component 165, and a user interface component 170. The subscribe component 160 subscribes to the presence information of the user's contacts. The registration component 165 registers the endpoint of the user with the live communication server 100 and publishes updates to the user's presence information. The user interface component 170 may provide windows, views, and other graphical elements that are presented to the user while interacting with the communication application 155.

The facility may be associated with a PSTN network 130 through which telephones (180 and 190) associated with each client can communicate. The telephones 180 and 190 may also each be associated with a legacy PBX 185 and 195. As needed, a remote call control (RCC) server 196 may provide an interface between the PBX (or other PSTN component) and the client computing devices. In this way, the client computing devices are made aware of activities occurring at the PBX where a call is being placed. For example, the remote call control server may serve as gateway to convert the standard protocol used by the communication application to the specific computer telephony integration (CTI) protocol supported by the PBX. While not shown, one or more gateway components may facilitate communication via the PSTN 130. For example, a SIP-PSTN gateway may be provided to facilitate calls between a computing device and a telephone.

The computing devices on which the facility is implemented may include a central processing unit, memory, input devices (e.g., keyboard and pointing devices), output devices (e.g., display devices), and storage devices (e.g., disk drives). The memory and storage devices are computer-readable media that may contain instructions that implement the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the facility may be implemented in various operating environments that include personal computers, server computers, hand-held or laptop devices, multiprocessor systems, microprocessor-based systems, programmable consumer electronics, digital cameras, network PCs, mini-computers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
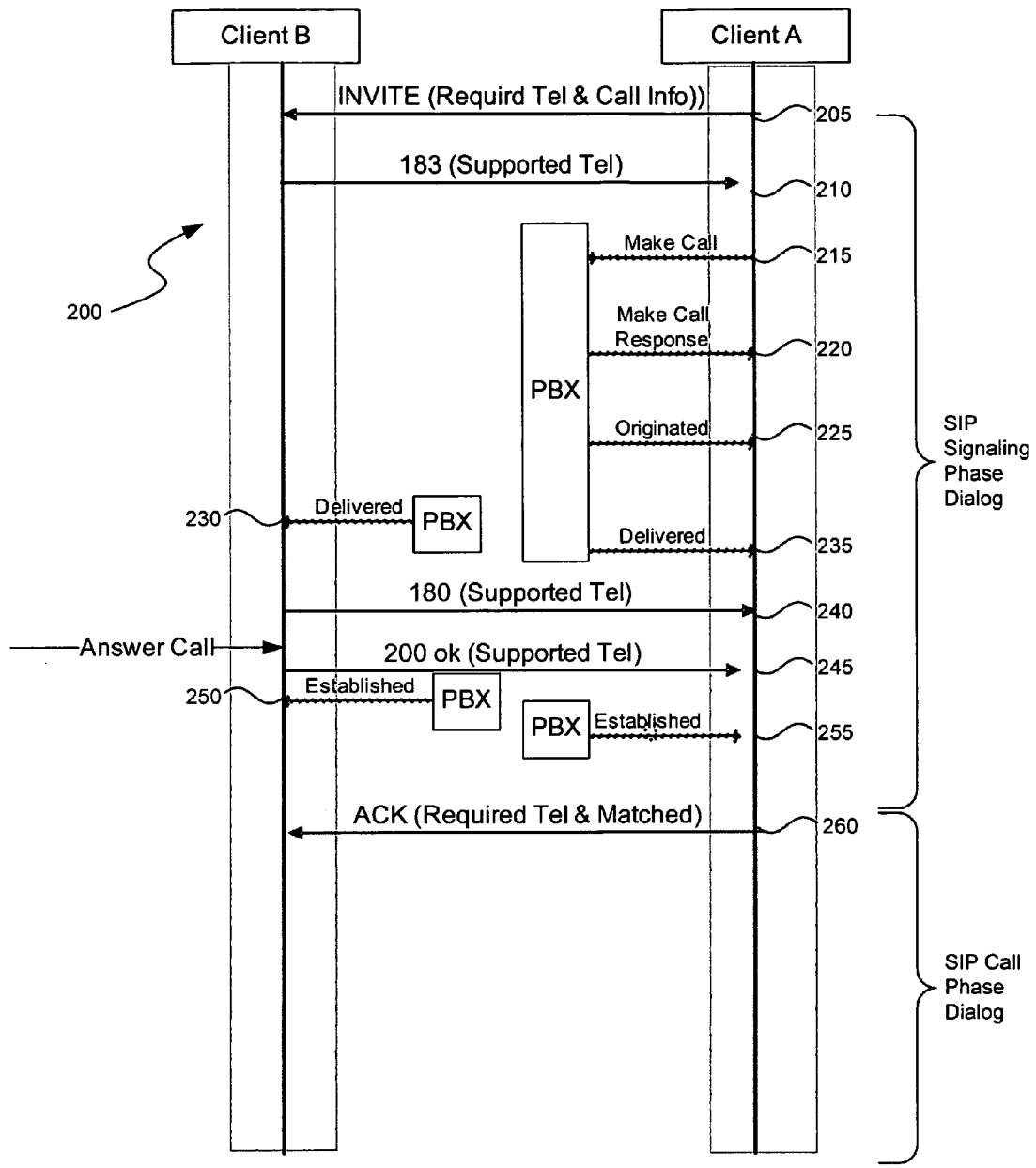
FIG. 2 is a networking diagram showing a flow of communication for establishing a SIP dialog in association with a phone call in one embodiment.

FIG. 2 is a network diagram showing a flow of communication (e.g., messages containing methods and responses) in SIP dialog establishment process 200 between two clients (such as client A 150 and client B 175 of FIG. 1) where client A is calling client B via the PSTN. The flow of communication in FIG. 2 occurs without the presence of race conditions (such as those caused by a third party attempting to make a call). In the illustrated embodiment, PSTN signaling occurs (represented using dashed arrows) via CSTA ECMA-269 call control abstraction (used by computing applications to monitor and control switching systems, such as PBX). In some embodiments, such signaling is implemented at respective PBXs, and possibly in association with a remote call control server. While depicted as traveling from client to client, SIP messages depicted in FIG. 2 (i.e., those shown with solid lines) may instead be communicated via a common server, such as the live communication server 100 of FIG. 1. Time progresses moving down the diagram such that messages at the top of the diagram are sent earlier in time than those at the bottom.

The process begins where client A sends a SIP INVITE 205 with a standard SIP Invite header and a call information header. The fields in this message 205 may include a caller telephone uniform resource identifier (URI), a called telephone URI, an optional caller ID (such as a corporate number), a call type (e.g., regular, consultant, conference, etc.), and so forth. Provided that there is the potential for SIP connectivity between client A and client B, in response, client B sends a SIP 183 (in progress) response 210 including a "supported telephone" header. This represents the beginning of a signaling phase of a SIP dialog. At this point, client B can anticipate receiving a call from client A. If it is not possible for client A to communicate with client B via SIP (e.g., no available address, no federation, etc.) client A will, instead of receiving a SIP 183 (in progress) response, receive a 4xx response code (indicating an error).

The next five communications (215, 220, 225, 230, and 235) signify signaling occurring with respect to the PSTN. If a remote call control server is used, these communications may be passed between the remote call control server and the respective client. Alternatively, they may be passed directly between a PBX and the respective client. In the illustrated embodiment, the first of these communications is a Make Call service request signal 215. This signal may be associated with assigning a connection ID to the calling device. Client A then receives a Make Call response signal 220, followed by an Originated signal 225. A Delivered signal 230 received by client B (received from client B's PBX or RCC) corresponds to client B's phone ringing. Client A also receives a Delivered signal 235 signifying the phone ringing event.

After both client A and client B have received Delivery signals, client B sends a SIP 180 (ringing) response 240. This response may include a supported telephone header. Likewise, in some embodiments, prior to client B sending an SIP 180 (ringing) response to client A, client A may send an SIP 180 (ringing) response to client B containing identifying information so client B can find out who is calling.

When the user associated with client B actually answers the ringing phone, client B sends a SIP 200 OK response 245. In addition to a supported telephone header, the fields in this response 245 may include a caller telephone uniform resource identifier (URI), a called telephone URI, and a status field.

By answering the ringing phone, the user associated with client B initiates further PSTN signaling. For example, both client B and client A may receive an Established signal (250 and 255, respectively) from their respective PBXs/RCCs. As a result of this signaling, Client A sends a SIP ACK 260. The SIP ACK 260 signifies the end of the INVITE transaction and the end of the signaling phase dialog). In addition to header information, this ACK may include information relating to a match flag. This allows Client B to associate the call with a SIP URI and a conversation window, thereby establishing a SIP call phase dialog.

Figure 3:
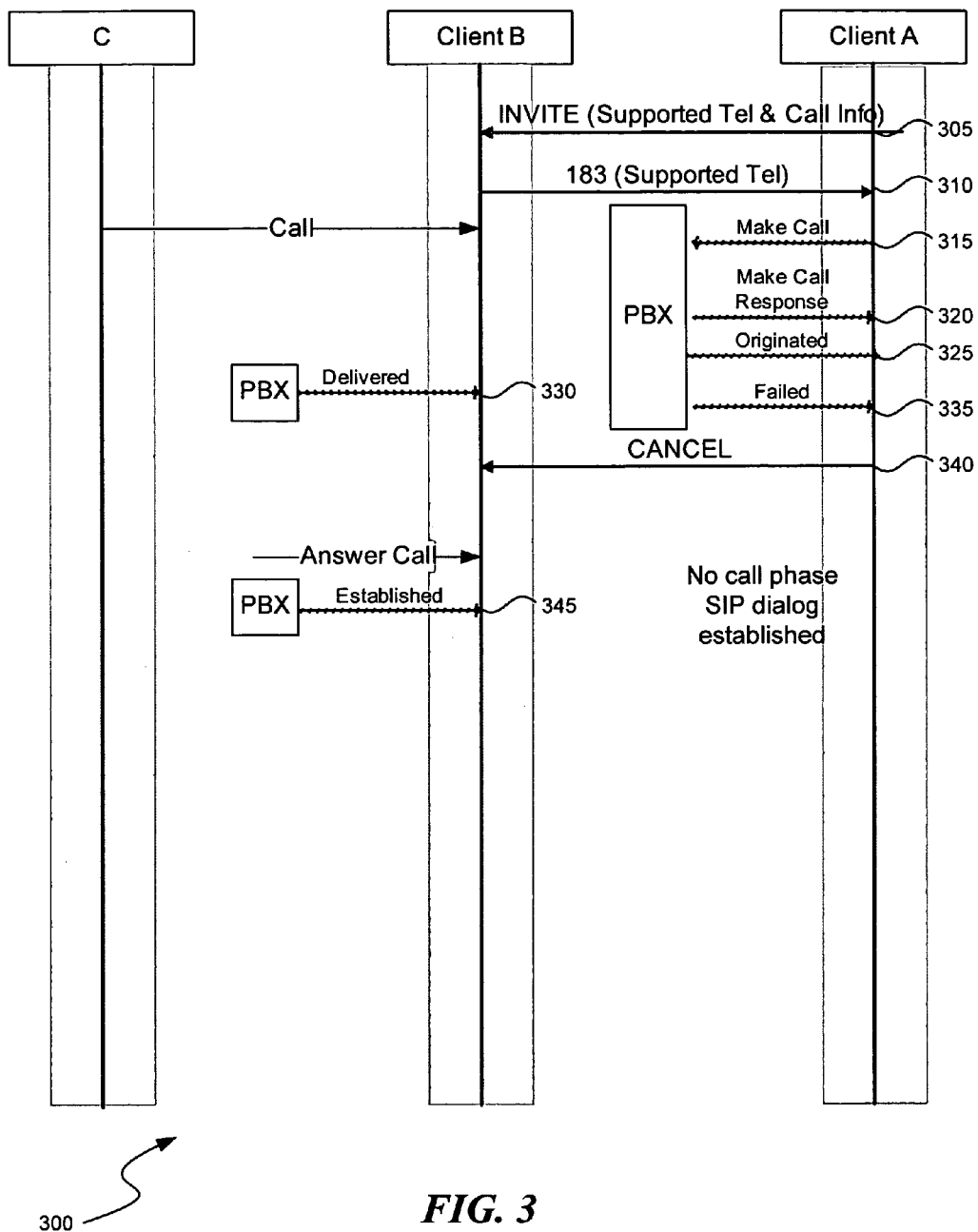
FIG. 3 is a networking diagram showing a flow of communication for establishing a SIP dialog in association with a phone call where race conditions exist.

FIG. 3 is a network diagram showing a flow of communication (e.g., messages containing methods and responses) in SIP dialog establishment process 300 between two clients (such as client A 150 and client B 175 of FIG. 1) where client A is calling client B via the PSTN. The flow of communication in FIG. 3 occurs in the presence of race conditions. More specifically, a third caller C is attempting to make a call to the telephone associated with client B at the same time that client A is attempting to call client B. As with respect to FIG. 2, in the illustrated embodiment of FIG. 3, PSTN signaling occurs (represented using dashed arrows) via ECMA-269 call control abstraction. In some embodiments, such signaling is implemented at respective PBXs, and possibly in association with a remote call control server. While depicted as traveling from client to client, SIP messages depicted in FIG. 3 (i.e., those shown with solid lines) may instead be communicated via a common server, such as the live communication server of FIG. 1.

The process begins where client A sends a SIP INVITE 305 with a standard SIP Invite header and a call information header, thus initiating an SIP signaling dialog. In response, B sends a SIP 183 (in progress) response 310 including a "supported telephone" header. In the next three communications (315, 320, and 325), client A conducts signaling communications with the PBX/RCC in an attempt to set up a PSTN call. However, prior to this occurring, caller C has called client B's phone. Accordingly, while the Make Call service request signal 215, the Make Call response signal 320, and the Originated signal 325 occur normally, client A receives a Failed signal 335 soon after C's call to client B's telephone is delivered (signal 330). At this point, client B anticipates that the ringing call is from client A. Then client B could answer the phone with a small risk of it not being client A. In response, client A sends out a SIP CANCEL 340 to client B. At this point, client B knows that the call is not from client A. This ends the process of establishing the SIP call phase dialog. In the meantime, the user associated with Client B answers the phone call from caller C, and receives an Established signal 345 from the PBX/RCC with respect to C's call.

Figure 4:
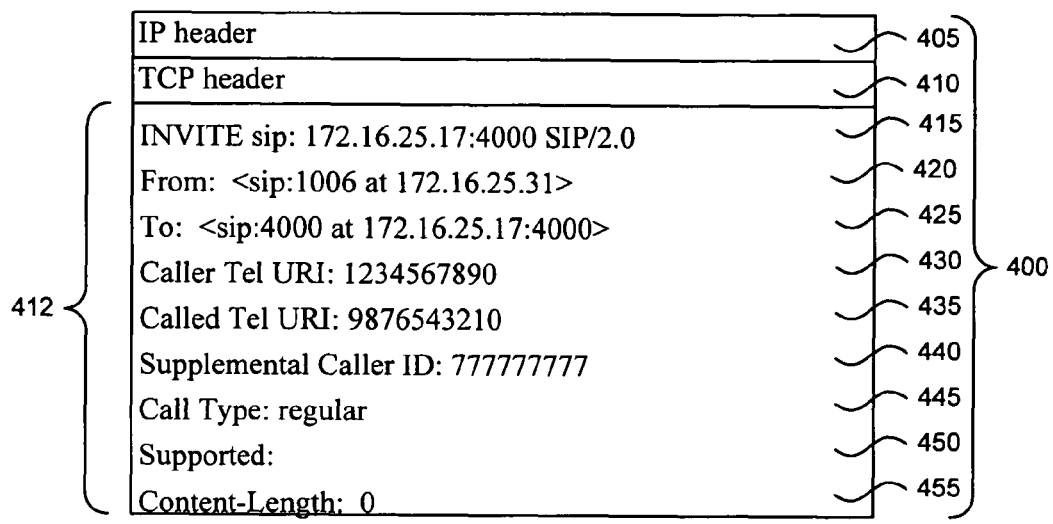
FIG. 4 shows the contents of a SIP INVITE message sent from a calling party client in one embodiment.

FIG. 4 shows the contents of an INVITE message 400 sent from a first SIP client (calling party) to a second SIP client (called party) via the live communication server in one embodiment. The INVITE message 400 includes an IP header 405, a TCP header 410, and a SIP message 412. Protocols other than TCP/IP may be used for the underlying transport. The SIP message 412 includes a request line 415 with SUBSCRIBE method, a From header 420, a To header 425, a Caller Tel URI header 430, a Called Tel URI header 435, a Supplemental Caller ID header 440, a Call Type header 445, a Supported header 450, and a Content-Length header 455. The From header 420 identifies 420 the sending client computing device (the caller). The To header 425 specifies which endpoint the sender of this packet is subscribing to (the called party). The Caller Tel URI header 430 specifies the telephone of the caller and the Called Tel URI header 435 specifies the telephone of the called party. The Supplemental Caller ID header 440 provides an alternative Caller ID (e.g., the ID of the corporation that the caller is associated with), and is optional. The Call Type header 445 specifies the type of the call, which may be, for example, a regular call, a conference call, a consultant call, etc. The Supported header 450 specifies any special behavior that the sender supports. The Content-Length header 455 has a value of 0 indicating that no data follows the SIP message header. In an alternative implementation, however, some of the data contained in the headers (e.g., Caller Telephone URI, Supplemental Caller ID, etc.) may, instead, be provided in the message data.

Figure 5:
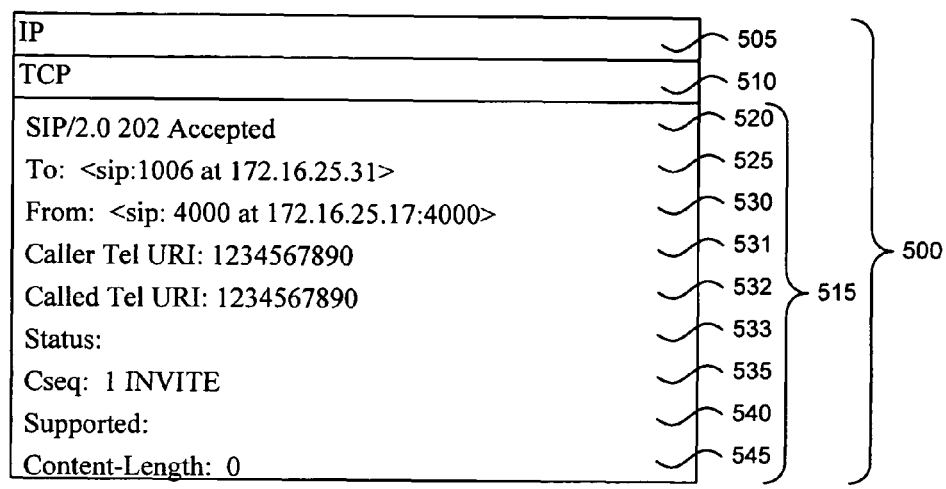
FIG. 5 shows the contents of a SIP INVITE response message sent from a called party client in one embodiment.

FIG. 5 shows the contents of an INVITE response 500 sent to a SIP client by a called party (via the live communication server) in one embodiment. The INVITE message 500 includes an IP header 505, a TCP header 510, and a SIP message 515. Protocols other than TCP/IP may be used for the underlying transport. The SIP message 515 includes a SIP response identifier 520, a To header 525, a From header 530, a Caller Tel URI header 531, a Called Tel URI header 532, a Status header 533, a CSeq header 535, a Supported header 540, and a Content-Length header 545. The SIP response identifier 520 identifies the SIP version 2.0 and the status of the request (e.g., 202 Accepted) indicating that the subscription succeeded. The To header 525 specifies the endpoint that the original sender of the request has subscribed to. The From header 530 specifies the original sender of the request. The Caller Tel URI header 531 specifies the telephone of the caller and the Called Tel URI header 532 specifies the telephone of the called party. The Status header 533 specifies the status of the calling system of the called party. The CSeq header 535 is contained on every message, both requests and responses, from the live communication server and is used as a sequence number to determine the relative order of messages from the server. A different sequence number is created for each SIP dialog, and the sequence number typically specifies the type of request that created the dialog. For example, the CSeq header 535 has a value 1 INVITE indicating that this is the first message from the server in the dialog created by an INVITE request between the endpoints specified by the To and From headers. Messages with a lower sequence number were sent from the server earlier than messages with a higher sequence number. The Supported header 540 specifies any special behavior that the sender supports. The Content-Length header 545 has a value of 0 indicating that 0 bytes of data follow the SIP message header. In an alternative implementation, however, some of the data contained in the headers (e.g., caller telephone URI, called telephone URI, match flag, etc.) may, instead, be provided in the message data.

Figure 6:
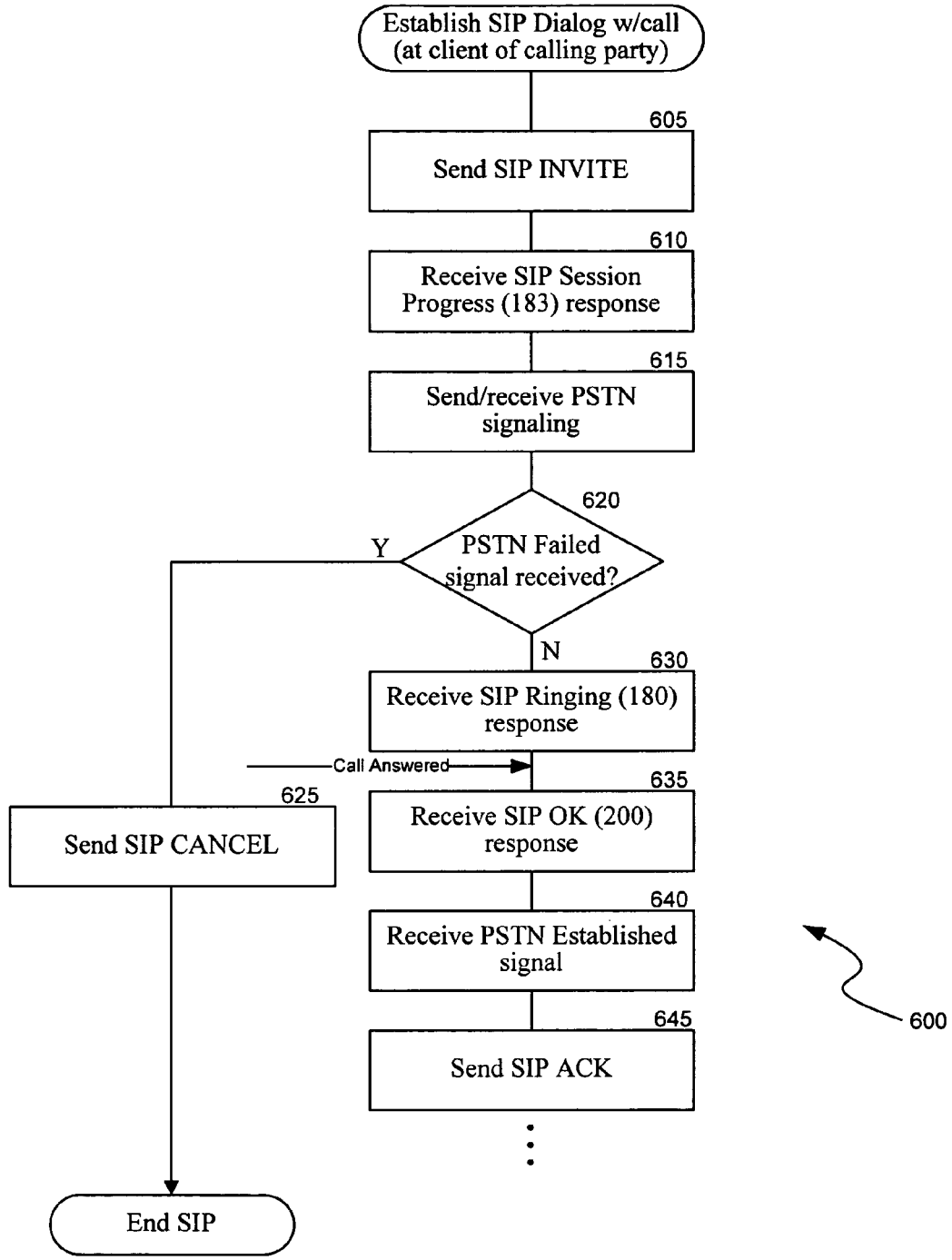
FIG. 6 is a flow diagram that illustrates a routine establishing a SIP dialog in association with a phone call at a caller computing device in one embodiment.

FIG. 6 is a flow diagram that illustrates a routine 600 at the calling party client computing device for establishing a SIP dialog in association with a phone call. The routine 600 is invoked when a calling party attempts to place a phone call using a communication application at his or her client computing device. At block 605, the routine 600 creates and sends a SIP INVITE message, which is, for example, sent to a live communication server to establish a connection with the client computing device of a called party. This scenario assumes that the client computing device of the called party is configured for SIP communications. If not, the phone call aspects of the call may still continue, but without the SIP dialog being established.

At block 610, SIP signaling phase dialog has been established, and the routine receives a SIP Session Progress (183) response from the server. At block 615, the calling party client computing device sends and receives one or more PSTN signals, which may include a Make Call signal, a Make Call response signal, an Originated response signal, a Delivery response signal, etc. As discussed above, these signals may be communicated between the client and the PBX directly or via a remote call control (RCC) interface. At decision block 620, if the signals at block 615 include a Failed response signal, this indicates that the PSTN call process has failed, and the routine continues at block 625 to send a SIP cancel message, which will terminate any further attempts at establishing a SIP dialog (or, alternatively, continue with the SIP dialogue so that the fact that a call was attempted can be logged at the client computing device of the called party).

If, however, at decision block 620, the signals at block 615 do not include a Failed response signal, the routine 600 continues at block 630, where it receives a SIP ringing (180) response. After answering of the call by the called party, at block 635, the routine 600 receives a SIP OK (200) response, indicating a successful transaction. While not specifically illustrated, if there is no answer by the called party, the routine 600 may eventually time out waiting for an OK response (instead of proceeding to block 635), causing the routine 600 to end.

At block 640, the routine 600 receives a PSTN Established signal from the PBX/RCC. In response, the routine 600 sends a SIP ACK (block 645) indicating that a SIP dialog has been established. The SIP dialog may then continue during, and possibly after, the call. It may be used to send messages (e.g., caller ID messages, call deflection messages, call waiting messages, etc.), without relying on PSTN signaling.

Figure 7:
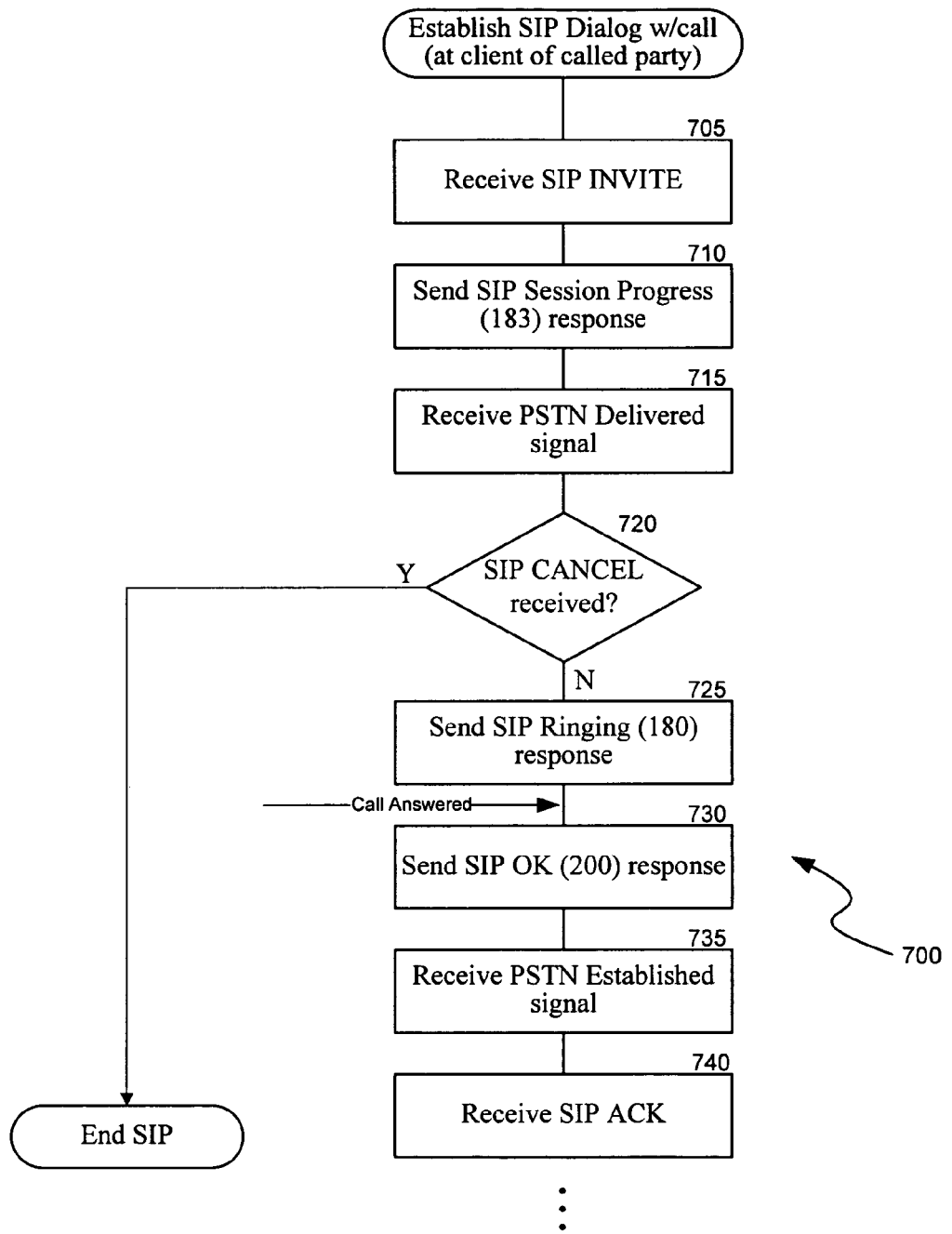
FIG. 7 is a flow diagram that illustrates a routine establishing a SIP dialog in association with a phone call at a called party computing device in one embodiment.

FIG. 7 is a flow diagram that illustrates a routine 700 at the called party client computing device for establishing a SIP dialog in association with a phone call. The routine 700 is invoked when a calling party attempts to place a phone call using a communication application at his or her client computing device. At block 705, the routine 700 receives a SIP INVITE message, which is, for example, sent from a live communication server after the client of the calling party has attempted to establish a connection with the client computing device of a called party. This scenario assumes that the client computing device of the called party is configured for SIP communications. If not, the phone call aspects of the call may still continue, but without the SIP dialog being established.

At block 710, the routine 700 creates and sends a SIP Session Progress (183) response from the server, which signifies the beginning of an SIP signaling phase dialog. At block 715, the routine 700 receives a PSTN Delivered signal, which indicates that a call has been placed for the called party on the PSTN. This signal may be communicated between the routine 700 and the PBX directly or via a remote call control (RCC) interface. If at decision block 720, the routine receives a SIP Cancel this indicates that the calling party client has detected a failure with the PSTN call set up, and no further SIP communications will take place (causing the routine 700 to end). If, however, at decision block 720, no SIP cancel message is received, the SIP communications continue at block 725, where the routine 700 creates and sends a SIP ringing (180) response.

After the called party has answered the call, at block 730 the routine 700 generates and sends a SIP OK (200) response, indicating a successful SIP transaction has occurred. While not specifically illustrated, if the called party does not answer, the routine 700 may eventually time out waiting for an OK response (instead of proceeding to block 730), causing the routine 700 to end.

At block 735, the routine 700 receives a PSTN Established signal from the PBX/RCC. Assuming the calling party client also receives a similar signal, the routine 700 receives a SIP ACK indicating that a SIP call phase dialog has been established (block 740). The established SIP dialog may then continue during, and possibly after, the call. It may be used to send messages (e.g., caller ID messages, call deflection messages, call waiting messages, etc.), without relying on PSTN signaling.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A method in a caller computing device for associating a telephone call with a caller so that a callee computing device can determine that a telephone call is from the caller, the method comprising:
   receiving an input from the caller to place a telephone call to the callee, wherein the telephone call is to be established over a public telephone network;
   sending, via an out-of-band communication mechanism that is out-of-band with respect to the public telephone network, to the callee computing device an indication that the caller is to initiate a telephone call with the callee via the public telephone network so that the callee can anticipate that an incoming call will be from the caller;
   in response to sending the indication, receiving via the out-of-band communication mechanism from the callee computing device a response to the indication; and
   after receiving the response at the caller computing device and after the telephone call has been initiated,
      upon receiving an indication that the initiated telephone call has been delivered to the callee as reported by the public telephone network, sending from the caller computing device via the out-of-band communication mechanism to the callee computing device an indication that the delivered telephone call is from the caller so that the callee computing device is aware that the telephone call is from the caller; and
      upon receiving an indication that the initiated telephone call has not been delivered to the callee as reported by the public telephone network, sending from the caller computing device via the out-of-band communication mechanism to the callee computing device an indication that the telephone call has not been delivered to the caller so that the callee computing device is aware that any delivered telephone call is not from the caller.

2. The method of claim 1 wherein the communication mechanism that is out-of-band with respect to the public telephone network is based on session initiation protocol (SIP).

3. The method of claim 1 wherein initiating the telephone call with the callee includes sending a session initiation protocol (SIP) INVITE message.

4. The method of claim 1 wherein initiating a telephone call with the callee includes sending a session initiation protocol (SIP) response providing an indication of identify associated with the callee.

5. The method of claim 1 further comprising sending and receiving public telephone network signals to and from a public telephone network component, wherein the signals are associated with establishing the telephone call over the public telephone network.

6. The method of claim 1 further comprising receiving an session initiation protocol (SIP) ACK from the callee computing device, wherein the session initiation protocol (SIP) ACK represents the end of a session initiation protocol (SIP) INVITE transaction and the beginning of a SIP call phase dialog between the caller computing device and the callee computing device.

7. A method in a callee computer system for providing at least one computer dialog in association with a telephone call made on a public switched telephone network from a caller to a callee, the method comprising:
   receiving a session initiation protocol (SIP) INVITE message, wherein the session initiation protocol (SIP) INVITE is associated with initiating a telephone call from the caller to the callee, wherein the session initiation protocol (SIP) INVITE message is sent from a caller computing device associated with the caller, the session initiation protocol (SIP) INVITE message indicating that the caller is to initiate a telephone call with the callee via the public telephone network so that the callee can anticipate that an incoming call will be from the caller;
   in response to receiving the session initiation protocol (SIP) INVITE message, sending to the caller computing device a session initiation protocol (SIP) response indicating that the callee computer system has received the session initiation protocol (SIP) INVITE message;
   receiving from the caller computing device a session initiation protocol (SIP) message indicating that the telephone call that has been delivered to the callee is from the caller; and
   notifying the callee that the delivered telephone call is from the caller.

8. The method of claim 7 wherein establishing the telephone call over the public switched telephone network includes:
   sending a Make Call signal from the caller computing device, wherein the Make Call signal is intended for receipt by a component of the public switched telephone network;
   receiving a Make Call signal at the caller computing device, wherein the Make Call signal originates at the component of the public switched telephone network;
   receiving an Originated signal at the caller computing device, wherein the Originated signal originates at the component of the public switched telephone network; and
   receiving a Delivered signal at the caller computing device, wherein the delivered signal originates at the component of the public switched telephone network and indicates that the second telephone is ringing.

9. The method of claim 8 wherein the component of the public switched telephone network is a private branch exchange (PBX).

10. The method of claim 8 wherein the component of the public switched telephone network is a private branch exchange (PBX), and wherein the Make Call signal, the Originated signal, and the Delivered signal are received from a remote call center interface.

11. The method of claim 7 wherein the session initiation protocol (SIP) INVITE message is received at a communication server, which passes it on to the callee computer system.

12. The method of claim 7 further comprising, if the telephone call is not delivered as indicated by receipt of a Failed signal originating from a component of the public switched telephone network, sending a request to Cancel commencing the session initiation protocol (SIP) dialog, wherein the request to Cancel is sent during the signaling phase.

13. A computer-readable storage medium containing computer-executable instructions for controlling a caller computing device of a caller to perform a method comprising:

sending via a computer network to a callee computing device of a callee an indication that the caller wants to establish a telephone call with the callee over a public switched telephone network, so that the callee can anticipate that an incoming telephone call will be from the caller;

receiving an indication that an initiated telephone call has been delivered to the callee as reported by the public switched telephone network; and sending via the computer network to the callee computing device an indication that the delivered telephone call is from the caller so that the callee can be made aware that the delivered telephone call is from the caller before the callee answers the delivered telephone call.

14. The computer-readable storage medium of claim 13 wherein initiating the telephone call includes sending a session initiation protocol (SIP) INVITE message.

15. The computer-readable storage medium of claim 13 wherein commencing the call phase dialog occurs after receiving a session initiation protocol (SIP) ACK from the callee computing device, wherein the session initiation protocol (SIP) ACK represents the end of a session initiation protocol (SIP) INVITE transaction.

16. The computer-readable storage medium of claim 13, including receiving a session initiation protocol (SIP) message indicating ringing at a telephone associated with the callee computing device.

17. The computer-readable storage medium of claim 13 including, receiving a 200 OK session initiation protocol (SIP) message indicating that a telephone associated with the callee computing device has been answered.

18. The computer-readable medium of claim 13 including, receiving a 183 session initiation protocol (SIP) message in response to initiating the telephone call, and wherein the 183 session initiation protocol (SIP) message provides an indication that the callee computing device supports a signaling phase dialog and a call phase dialog.

19. The computer-readable medium of claim 13 wherein messages to be passed between the caller and callee computing devices during a call phase dialog include textual information.

* * * * *